Oct. 16, 1962 W. E. BUCK 3,058,342
LOAD-SENSITIVE SYSTEM FOR MEASURING INSTRUMENTS
Filed April 13, 1959

INVENTOR.
WILLARD E. BUCK
BY
ATTORNEYS

United States Patent Office 3,058,342
Patented Oct. 16, 1962

3,058,342
LOAD-SENSITIVE SYSTEM FOR MEASURING
INSTRUMENTS
Willard E. Buck, Boulder, Colo., assignor, by mesne assignments, to Thomas W. Russell, Boulder, Colo.
Filed Apr. 13, 1959, Ser. No. 806,086
12 Claims. (Cl. 73—141)

This invention relates broadly to measuring instruments and, more specifically, to load-sensitive systems of a type especially adapted for use in measuring devices of various types.

A number of different types of measuring devices are known to the art which provide as their load-responsive element, an indicator, such as a pointer or mirror, suspended between two or more filaments arranged in opposed relation between a pair of supports, at least one of which is movable relative to the other. Various optical, mechanical and electrical read-out systems of conventional construction can be associated with the mirror in a manner to translate the degree of angular deflection thereof into a direct measure of the forces applied to one or both of the supports.

These systems, while theoretically extremely accurate, have been found to possess many inherent deficiencies that severely limit their utility and dependability where precision is required. One of their most serious limitations is that of hysteresis. For example, nearly all of the prior art load-sensitive systems of this type rely upon some type of auxiliary spring assembly to yieldably hold the indicator and associated filaments in an angularly deflected position. This spring-assembly, the joints between the spring and indicator assembly, and oftentimes the indicator assembly itself, include hysteresis effects that render the load-sensitive system inaccurate and the results thereof unreproducible.

Of almost equal seriousness are the effects of external friction between the one or more relatively movable elements of the prior art systems. In nearly every case, the known measuring devices include at least one, and oftentimes several, friction points which obviously have a very substantial effect on the degree of precision that can be achieved.

The temperature coefficient of the system can also become an important factor especially where several materials having different coefficients of expansion are used together. In addition, a great number of these instruments drift badly with repeated use thus rendering the results unreproducible and requiring frequent recalibration.

It has now been found, however, in accordance with the teaching of the present invention that a load-sensitive system of this same general type can be made which eliminates the aforementioned deficiencies usually present in the prior art devices, at least to an extent where their effect on the accuracy of the system is not appreciable when compared with the results achieved thereby. Basically, the improved load-sensitive system comprises a pair of supporting surfaces made of the same material and arranged in spaced relation to one another with at least one of said supporting surfaces being movable relative to the other. Two pairs of filaments, also of the same material as the supporting surfaces, are fused thereto in opposed relation and positioned to receive an indicating means or mirror which is attached between the free ends thereof when in partially skewed relation. Each filament is pre-loaded torsionally in the same direction and substantially the same amount to turn the indicator and move both filament pairs into a more completely skewed relation as the filaments tend to become untwisted; while, at the same time, both pairs of filaments are pre-loaded tensionally which turns the mirror in the opposite direction as the filament pairs tend to move from the skewed toward a coplanar relation. Thus, the mirror is stabilized in an intermediate position by two opposed and balanced torsional force components, one of which results from the torsional pre-loading of the filaments and the other from the torsional pre-loading of the filaments and the other from the pre-load tension in the filaments that creates a counteracting torsional force component as the filament pairs tend to return from the skewed relation toward a coplanar relation.

From the foregoing brief description, several unique features of the instant load sensitive system should already be apparent. First of all, and of considerable importance, it utilizes a fused integral assembly formed from a single material. Thus, by selecting a material for the components which has the characteristic of no, or at least minimal, hysteresis such as, for example, quartz or "Pyrex" glass, the hysteresis effects on the system can be reduced to no more than that of the material chosen. The extent to which the undesirable effects of hysteresis can be eliminated from a measuring device are best indicated by the fact that a barometer equipped with the instant load-sensitive system in the form of a Bourdon tube used to provide the opposed supporting surfaces, filaments and an indicator made from fused quartz, showed no measurable hysteresis or drift when tested against a mercury barometer. The same barometric device made from "Pyrex" glass exhibited slight hysteresis but was still capable of extremely accurate pressure measurements.

Secondly, the system is frictionless for all practical purposes as there is no friction point at which one element must move relative to another while in slidable contact therewith. This is best shown by the fact that a quartz system gives a reproducible sensitivity of one part per hundred-thousand in measuring distances of the order of two-thousandths of an inch. The reproducible sensitivity of a "Pyrex" system without recalibration has been found to be about one part in twenty thousand which, while less than the fused quartz system, is still far better than that of the prior art devices.

Third, the system eliminates all auxiliary spring assemblies because of the fact that each filament is pre-loaded both torsionally and tensionally with the mirror suspended therebetween. This unique arrangement makes the use of auxiliary spring assemblies and their attendant problems with mountings, bearings, couplings, etc., unnecessary. Pre-loading the filaments also becomes of substantial importance when it is considered that the mirror is never permitted to float or swing freely but is always stabilized by filament tension and torsion. Also, the four points of attachment of the filaments to their respective supports preferably define two intersecting planes $x$—$x$ and $y$—$y$ as indicated in FIGURE 5 rather than a common plane. Thus, although each pair of filaments when tensioned will tend to return to a coplanar relation, the pairs will never be coplanar at the same time, as when one is coplanar, the other is becoming more fully skewed resulting in a more uniform and linear load/deflection ratio.

Further, the temperature coefficient of the system if extremely low primarily due to the fact that elements and joints therebetween are all formed from the same material selected to provide a low coefficient of expansion. A quartz system shows a temperature coefficient of about one-tenth of one percent per twenty degree rise in temperature or, in other words, about one part in ten thousand per degree centigrade.

Finally, the ultimate test of any measuring instrument is its sensitivity and devices incorporating the above-described load-sensitive system have been proven to be substantially better than the best of the prior art devices regardless of construction. For purposes of comparison, it will be well to consider the sensitivity of the interferometer which is generally recognized as being the most sensitive of all known measuring instruments with reproducible accuracy. An interferometer is capable of making measurements to one-tenth of a fringe or one-millionth of an inch at best. A measuring instrument constructed to include a fused quartz load-sensitive system such as that set forth herein, on the other hand, has been used to measure distance to the nearest hundred thousandths of two-thousandths of an inch or, in other words, to the nearest fifty-millionths of an inch. As such, it will immediately become apparent that the instant load-sensitive system can be constructed to provide sensitivities which are fifty times greater than an interferometer. Even an instrument with a fused "Pyrex" load-sensitive system instead of the fused quartz system is capable of accuracies of ten-millionths of an inch without recalibration which is ten times more sensitive than the interferometer. Actually, the reading accuracy of instruments equipped with the fused quartz and fused "Pyrex" systems are the same, however, the slight hysteresis present in the "Pyrex" system reduces the reproducibility of the results without recalibration to approximately one-fifth of the quartz system.

It is, therefore, the principal object of the present invention to provide a load-responsive rotating indicator system for use in measuring instruments that is many times more sensitive than any of the prior art assemblies for this purpose regardless of construction.

A second object is the provision of a load-responsive system of the class described which can be constructed with no measurable hysteresis.

Another objective of the instant invention is the provision of a load-sensitive system for measuring instruments that is substantially frictionless.

Still another object is to provide a load-sensitive assembly which has extremely low temperature sensitivity.

Additional objects of the present invention are the provision of a load-sensitive rotating indicator system for use in measuring devices that is simple, relatively inexpensive, simple to calibrate, easy to read, compact, relatively rugged, extremely reliable, and one that is quite versatile in that it is adaptable for use in many different types and styles of measuring instruments.

Other objects will be in part apparent and in part pointed out specifically hereinafter in connection with the description of the drawing that follows, and in which.

Figures 1, 2, 3:
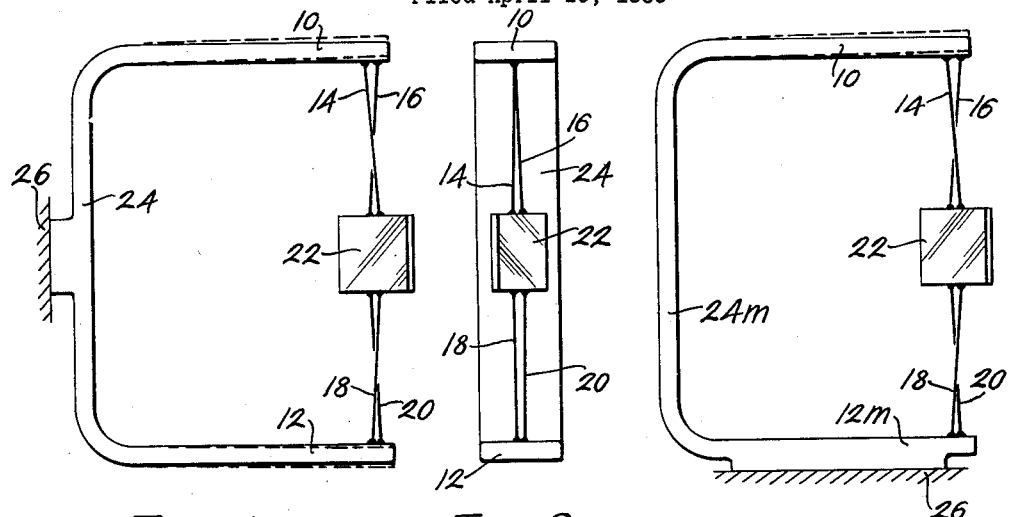
FIGURE 1 is a side elevation showing one form of the load-sensitive system of the present invention in which both supporting surfaces thereof are movable under load in a direction to vary the tension in the pairs of filaments holding the indicator.
FIGURE 2 is an end view of the system shown in FIGURE 1.
FIGURE 3 is a side elevation similar to FIGURE 1 except that a slightly modified supporting structure has been shown in which only one of the supporting surfaces is movable, the other being fixed.
Figure 4:
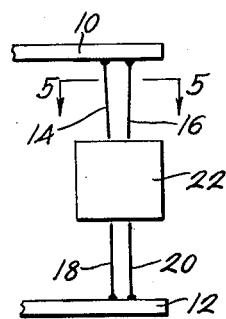
FIGURE 4 is a schematic view showing the position of the supporting surfaces, the pairs of filaments attached thereto and a mirror-type indicator before it is suspended between the filaments.

Referring now to the drawing, and particularly to FIGURES 1 and 2 thereof, the load-responsive rotating indicator system of the present invention will be seen to include as its basic components, a pair of supporting surfaces 10 and 12 arranged in opposed spaced relation for movement relative to one another in response to a load applied thereto such as to change the spacing therebetween, a first pair of filaments 14 and 16 attached to supporting surface 10, a second pair of filaments 18 and 20 attached to supporting surface 12 in opposed relation to the first pair, and an indicator in the form of a mirror 22 suspended between the free ends of both pairs of filaments. In the preferred embodiments of the present invention, the supports, filaments and mirror are all formed from the same material as are the fused joints that interconnect these elements one with the other. Of prime consideration in selecting a suitable material is that it exhibit little or no hysteresis such as, for example, quartz and "Pyrex" glass which are two substances that are known to be well suited to this use. Also, the chosen material should have a low coefficient of expansion in order that changes in temperature will not have any appreciable effect on the system.

In FIGURES 1 and 2 it will be seen that supporting surfaces 10 and 12 are integrally connected to one another by means of a bridge portion 24 which is, in turn, attached to a base 26. In the modification of FIGURE 3, on the other hand, supporting surface 12m is fixed by reason of its attachment to base 26 leaving supporting surface 10 the only movable one, and bridge portion 24m is also free of the base. Thus, in FIGURES 1 and 2, both supporting surfaces 10 and 12 are free to spring toward and away from one another under load; whereas, in FIGURE 3, only supporting surface 10 is free to move relative to fixed supporting surface 12m.

Figure 5:
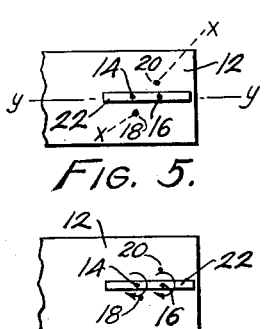
FIGURE 5 is a section taken along line 5—5 of FIGURE 4.

Now, in connection with FIGURES 4–11, inclusive, one of the several methods by which the indicator can be suspended for rotational movement between the pairs of filaments will be described. First, with reference to FIGURES 4 and 5 it will be seen that the filaments of each pair are connected to their respective supporting surfaces by means of fused joints and are initially arranged in spaced substantially coplanar relation to one another. Also, both filament pairs are preferably located in intersecting planes x—x and y—y as indicated in FIGURE 5 rather than in a common plane before the indicator is connected therebetween. It is important that the planes defined by the coplanar pairs of filaments before the indicator is connected therebetween intersect one another rather than be in a common plane in order to reduce the non-linearity in the system. For example, if the planes defined by the coplanar pairs of filaments are a common plane prior to attachment of the indicator therebetween, considerable non-linearity may be present in the system depending on the angle of swing of the indicator, the tensional and torsional forces, etc.; whereas, if these planes intersect one another such that, when the indicator is attached between the pairs of filaments, only one pair at a time can return to coplanar relation because the other pair is skewed and resisting this motion, the non-linearity of the system can be reduced to one percent or less. The indicator is positioned between the free ends of the filaments with its axis of rotation coincident with the line of intersection defined by the planes determined by the pairs of filaments when in coplanar relation.

Figure 7:
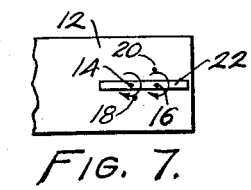
FIGURE 7 is a section taken along line 7—7 of FIGURE 6.
Figure 6:
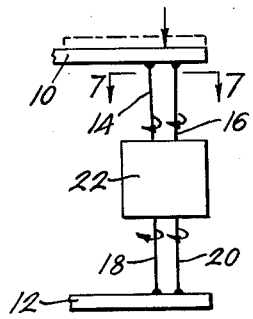
FIGURE 6 is a view similar to FIGURE 4 showing the manner in which the filaments are pre-loaded torsionally and the supporting surfaces are moved together prior to fastening the indicator in place.

Then, as shown in FIGURES 6 and 7, the gap between the supporting surfaces is narrowed by loading one or both thereof in a manner to force them toward one another as indicated by the arrow in FIGURE 6 moving supporting surface 10 from the dotted line to the full line position. Also, before the free ends of the filaments are connected to the indicator, each filament is pre-loaded torsionally or twisted in the same direction and substantially the same amount. This has been indicated by the curved arrows around the filaments and clockwise rotation thereof has been chosen for purposes of illustration as viewed in FIGURE 7. At this point, the indicator is attached to the free ends of the twisted filaments by fused joints.

Figure 8:
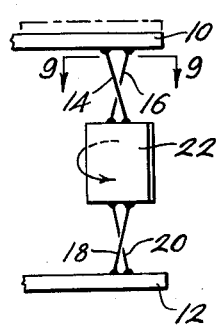
FIGURE 8 is a view similar to FIGURES 4 and 6 but showing the indicator attached to the free ends of the filaments and released for rotational movement.
Figure 9:
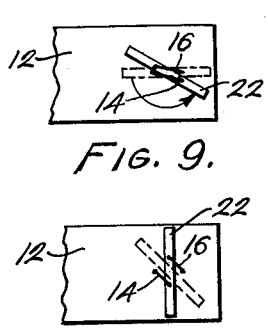
FIGURE 9 is a section taken along line 9—9 of FIGURE 8.

FIGURES 8 and 9 show that as soon as the indicator is fastened to the filaments and then released, it will turn in a direction opposite to that in which the filaments were preloaded torsionally as they unwind and attempt to return to their original untwisted condition. This unwinding of the filaments, of course, causes the indicator to turn and also moves the filaments of each pair from a partially skewed into a more fully skewed relation. At this point it should be mentioned that the torsional preloading of each filament can be greater than a full half-turn or twist provided that the pre-load tension to which the filament pairs are also subjected always remains sufficient to prevent them from moving into a crossed relation in which one filament of a pair touches the other. Therefore, the mirror will turn counter clockwise as viewed in FIGURE 9 or, more specifically, in the direction of the curved arrow from the dotted-line to the full-line position.

Figure 11:
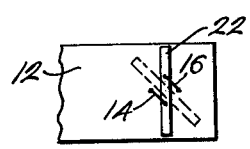
Figure 10:
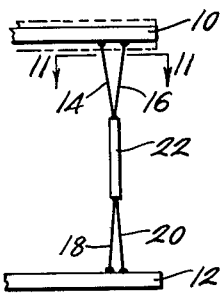
FIGURE 10 is a view quite like FIGURES 4, 6 and 8 showing the position of the indicator filaments and supporting surfaces following release of the compression load; and, FIGURE 11 is a section taken along line 11—11 of FIGURE 10.

The last step can best be seen in FIGURES 10 and 11 wherein the load which has been applied to force the supporting surfaces toward one another is released. This, of course, permits supporting surface 10 to spring away from supporting surface 12 placing all the filaments under a pre-load tension. Obviously, with the filaments thus tensioned, supporting surface 10 cannot return all the way to the dotted-line position of FIGURE 10 which it occupied originally in relation to supporting surface 12. Accordingly, supporting surface 10 will move from the dot-dashed-line position to the full-line position shown therein. Now, as the filaments are placed under tension in the manner just described, each pair thereof will move in the direction of the coplanar relation of FIGURES 6 and 7 instead of remaining fully skewed as shown in FIGURES 8 and 9. At the same time, however, the filaments are again being loaded torsionally or twisted when the indicator turns clockwise as viewed in FIGURE 11. It will be apparent, therefore, that at some intermediate point between these two extreme positions of the indicator (FIGURES 7 and 9) the torsional force component in the filaments which is acting to turn the indicator in a direction to skew the filament pairs will be counterbalanced and offset by an opposing torsional force component acting on the filament pairs by reason of their pre-load tension that tends to turn the indicator in the opposite direction and return the pairs to a more nearly coplanar relation. Thus, the indicator will move from the dotted-line position in FIGURE 11 clockwise to the full-line position. The degree of pre-load tension and torsion placed in the filaments is preferably such that the indicator is left with at least a 45° swing between its stable position and position of maximum deflection to eliminate errors arising from a short sweep of the read-out system used therewith. In this connection it should be mentioned that if the above-described load-responsive system is to be used in a measuring instrument in which the forces applied thereto are primarily compression loads tending to move the supporting surfaces toward one another, then the pre-load tension in the filaments should be sufficiently high to provide the pairs of filaments with almost their maximum twist as the swing of the indicator under load will be in the direction to untwist the filaments. An example of such a measuring instrument might be a comparator in which the workpiece was placed between movable supporting surface 10 of the FIGURE 3 modification and another fixed element (not shown) located above support 10. If, on the other hand, the loads are to be primarily in the form of tension forces acting to spread the supporting surfaces apart, the reverse is true and the filament tension should be slight in stable position providing the greatest range of indicator swing in a direction to load the filaments torsionally as they tend to move in the direction of a coplanar relation. A scale would provide a good example of such an instrument wherein the FIGURE 3 modification would be turned upside down and the workpiece to be weighed suspended from movable supporting surface 10. It is also possible that the load-responsive system disclosed herein might be used in an instrument such as a barometer wherein readings on both sides of stable position would be required. Obviously, in this instance, the filament tension should be adjusted to place the indicator in about a mid-position between that of FIGURES 7 and 9.

From the foregoing, it becomes readily apparent that the success of the instant load-sensitive rotating indicator system is dependent upon the torsional pre-loading of the filaments in a direction to oppose the counteracting torsional force component arising from the tensional pre-loading thereof which functions to return the filament pairs from skewed to a more nearly coplanar relation. Of no less importance, however, is the use of an integral system formed from a single substance having low hysteresis characteristics. The latter, of course, becomes more important as the sensitivity of the instrument in which the load-sensitive system is used, increases.

Although it forms no part of the present invention, it is apparent that the above-described load-responsive rotating indicator system using a mirror having at least one plane polished reflecting surface as the indicator can easily be combined with any one of a number of well-known frictionless optical read-out systems of a type which includes a calibrated scale to produce a measuring instrument of considerable sensitivity. Such an optical read-out system might include a telescope containing a hairline focused on the mirror which reflects a portion of a calibrated scale. The hairline appears superimposed upon a portion of the scale as viewed in the mirror through the telescope. Also, a slit of light can be focused on the mirror through a suitable lens and reflected onto a calibrated scale to provide a direct reading. In addition, there are many ways in which the supporting surfaces may be moved relative to one another such as, for example, by making them in the form of pressure-responsive diaphragms, deflectable arms, a Bourdon tube, a bellows, and many others which are commonplace in the art.

Having thus described the several useful and novel features of the load-sensitive system that forms the subject matter of the present invention, it will be apparent that the several worthwhile objectives for which it was designed have been achieved. Although but two specific embodiments of the invention have been illustrated and described in connection with the accompanying drawings, I realize that certain changes and modifications therein may occur to those skilled in the art within the broad teaching found herein; hence, it is my intention that the scope of protection afforded hereby shall be limited only insofar as said limitations are expressly set forth in the appended claims.

What is claimed is:

1. A load-sensitive system for use in measuring instruments and the like which comprises, a first supporting means, a first pair of filaments attached to the first supporting means in spaced relation to one another, indicating means attached to the free ends of the first pair of filaments, a second pair of filaments attached to the indicating means in spaced relation to one another opposite the first pair of filaments, and a second supporting means attached to the free ends of the second pair of filaments adapted for movement under load relative to the first supporting means in a direction to change the spacing therebetween, each filament being pre-loaded torsionally in the same direction substantially the same amount to produce a first torsional force component adapted to move both filament pairs toward skewed relation turning the indicating means in one direction, and both filament pairs being pre-loaded tensionally to produce a second torsional force component adapted to counterbalance the first torsional force component and move said pairs toward coplanar relation turning the indicating means in the opposite direction.

2. The load-sensitive system as set forth in claim 1 in which both supporting means, both pairs of filaments and the indicating means are formed from the same material and fused joints are used at the points of connection therebetween.

3. The load-sensitive system as set forth in claim 1 in which both the first and second supporting means are mounted for movement relative to the other in a direction to change the spacing therebetween.

4. The load-sensitive system as set forth in claim 1 in which the four points of connection between the filaments and supporting means define two intersecting planes.

5. The load-sensitive system as set forth in claim 1 in which the first and second supporting means comprise opposed surfaces of a unitary structure, at least one of said surfaces being springable.

6. The load-sensitive system as set forth in claim 1 in which the indicating means comprises a mirror having a plane polished surface lying in substantially parallel relation to the axis of rotation thereof.

7. The load-sensitive system as set forth in claim 2 in which the common material comprises quartz.

8. The load-sensitive system as set forth in claim 3 in which means comprising a fixed base interconnects the first and second supporting means.

9. The load-sensitive system as set forth in clam 3 in which the first and second supporting means comprise opposed springable surfaces interconnected by a substantially fixed base.

10. The load-sensitive system as set forth in claim 4 in which the two planes intersect along a line substantially coincident with the axis of rotation of the indicating means.

11. The load-sensitive system as set forth in claim 5 in which the other of said surfaces comprises a fixed base.

12. The load-sensitive system as set forth in claim 5 in which both of said surfaces are springable and the unitary structure includes a fixed base interconnecting said springable surfaces.

References Cited in the file of this patent

UNITED STATES PATENTS

| | | |
|---|---|---|
| 2,279,261 | Crawford et al. | Apr. 7, 1942 |
| 2,295,026 | Brown et al. | Sept. 8, 1942 |
| 2,564,669 | Brady | Aug. 21, 1951 |
| 2,576,221 | Segerstad | Nov. 27, 1951 |

FOREIGN PATENTS

| | | |
|---|---|---|
| 178,789 | Great Britain | Apr. 18, 1922 |